(12) United States Patent
Jang et al.

(10) Patent No.: US 12,018,153 B2
(45) Date of Patent: Jun. 25, 2024

(54) LATEX COMPOSITION FOR DIP MOLDING, MANUFACTURING METHOD THEREFOR, AND MOLDED PRODUCT MOLDED THEREFROM

(71) Applicant: LG Chem, Ltd., Seoul (KR)

(72) Inventors: Myung Su Jang, Daejeon (KR); Ji Hyun Kim, Daejeon (KR); Won Sang Kwon, Daejeon (KR); Tae Shik Yoon, Daejeon (KR)

(73) Assignee: LG Chem, Ltd., Seoul (KR)

( * ) Notice: Subject to any disclaimer, the term of this patent is extended or adjusted under 35 U.S.C. 154(b) by 581 days.

(21) Appl. No.: 17/286,993

(22) PCT Filed: Sep. 1, 2020

(86) PCT No.: PCT/KR2020/011696
§ 371 (c)(1),
(2) Date: Apr. 20, 2021

(87) PCT Pub. No.: WO2021/060729
PCT Pub. Date: Apr. 1, 2021

(65) Prior Publication Data
US 2021/0388186 A1   Dec. 16, 2021

(30) Foreign Application Priority Data
Sep. 27, 2019   (KR) .................. 10-2019-0119307

(51) Int. Cl.
| C08L 9/04 | (2006.01) |
| B29C 41/00 | (2006.01) |
| B29K 9/00 | (2006.01) |
| C08F 220/46 | (2006.01) |
| C08K 5/103 | (2006.01) |

(52) U.S. Cl.
CPC .............. *C08L 9/04* (2013.01); *B29C 41/003* (2013.01); *C08F 220/46* (2013.01); *B29K 2009/00* (2013.01); *C08K 5/103* (2013.01)

(58) Field of Classification Search
CPC ........ C08L 9/04; B29C 41/003; C08F 220/46; B29K 2009/00; C08K 5/103
USPC ........................................................ 526/341
See application file for complete search history.

(56) References Cited

U.S. PATENT DOCUMENTS

| 5,357,636 A | 10/1994 | Dresdner, Jr. et al. |
| 5,891,936 A * | 4/1999 | Liddell .................... C12P 7/625 528/361 |
| 5,977,250 A * | 11/1999 | George ................... C12P 7/625 527/202 |
| 9,803,070 B2 * | 10/2017 | Yang ....................... C08L 55/02 |
| 10,273,350 B2 | 4/2019 | Sagitani |
| 2012/0149859 A1 | 6/2012 | Yang et al. |
| 2016/0251534 A1 | 9/2016 | Burlett et al. |

FOREIGN PATENT DOCUMENTS

| JP | 3448301 B2 | 9/2003 |
| JP | 2006199923 A | 8/2006 |
| KR | 20100133638 A | 12/2010 |
| KR | 101582005 B1 | 12/2015 |
| KR | 20170047880 A | 5/2017 |
| KR | 20170125363 A | 11/2017 |
| KR | 101811343 B1 | 12/2017 |

OTHER PUBLICATIONS

International Search Report for Application No. PCT/KR2020/011696 dated Dec. 7, 2020, pp. 1-3.

\* cited by examiner

*Primary Examiner* — Michael M. Bernshteyn
(74) *Attorney, Agent, or Firm* — Lerner David LLP

(57) ABSTRACT

A latex composition for dip molding includes a carboxylic acid-modified nitrile-based copolymer latex and a cholate-based emulsifier, wherein the cholate-based emulsifier is included in an amount of 0.02 to 3 parts by weight based on a solid content with respect to a solid content of 100 parts by weight of the carboxylic acid-modified nitrile-based copolymer latex. A method of preparing the latex composition for dip molding and a molded article produced using the same are also provided.

9 Claims, No Drawings

LATEX COMPOSITION FOR DIP MOLDING, MANUFACTURING METHOD THEREFOR, AND MOLDED PRODUCT MOLDED THEREFROM

CROSS-REFERENCE TO RELATED APPLICATIONS

The present application is a national phase entry under 35 U.S.C. § 371 of International Application No. PCT/KR2020/011696, filed Sep. 1, 2020, which claims priority to Korean Patent Application No. 10-2019-0119307, filed Sep. 27, 2019, the disclosures of which are incorporated herein by reference.

TECHNICAL FIELD

The present invention relates to a latex composition for dip molding, and more particularly, to the latex composition for dip molding, a method of preparing the same, and a molded article produced using the same.

BACKGROUND ART

Usage of a latex molded article, for example, a disposable rubber glove, has increased in various fields such as housework, the food industry, the electronic industry, and medical fields. In the past, a disposable glove was made by dip molding a natural rubber latex, but a protein was problematic due to an allergic reaction such as pain or a rash in some users. Because of these problems, recently, a disposable glove made by dip molding a nitrile-based latex instead of the natural rubber latex has been spotlighted.

Recently, glove manufacturers manufacturing a nitrile-based rubber glove using a nitrile-based latex have been continually striving to increase productivity and to reduce a defective rate. One of the methods of reducing a defective rate of gloves is a method of manufacturing a glove through a double dip molding method. However, in the case of the double dip molding method, a syneresis phenomenon occurs in a molded article produced by primary dip molding, and thus, when the molded article is subjected to secondary dip molding, stability of the latex is reduced. In a case where the stability of the latex composition is low, a coagulation (agglutination, flocculation, agglomeration, or coalescence) is generated, and precipitation is thus generated at a lower portion of the latex. The coagulation adheres to a finally produced dip-molded article or a pin hole is generated due to the coagulation, which increases a defective rate. As a result, tensile strength and stretchability of a latex glove which is a final product are reduced.

Meanwhile, one of the considerations of a user when using a glove is wearability. However, in the case of the nitrile-based rubber glove, wearability is not good due to a relatively high modulus as compared to that of a glove formed of a natural rubber.

Therefore, a latex composition for dip molding that may solve the syneresis problem in a production process of a glove and implement comfortable wearability due to a low modulus is required.

DISCLOSURE

Technical Problem

In order to solve the problems mentioned in the background art, an object of the present invention is to increase a syneresis time to thereby improve the stability of a latex composition for dip molding during dip molding by using the latex composition for dip molding, and thus to maintain physical properties of a dip-molded article such as a glove produced using the same at an equivalent or higher level.

That is, in the present invention, by including a cholate-based emulsifier when preparing a carboxylic acid-modified nitrile-based copolymer latex composition, an aggregation of latex particles in a latex composition is suppressed to improve dispersibility, such that stability of the latex particles is excellent. Therefore, an object of the present invention is to ultimately provide a latex composition for dip molding capable of implementing an increase in syneresis time and stability improvement due to the increased syneresis time during dip molding, and implementing improvement of wearability of a dip-molded article produced using the same such as a glove through improvement of tensile strength of the dip-molded article, and a reduction in modulus of the dip-molded article, a method of preparing the same, and a dip-molded article molded from the same.

Technical Solution

In one general aspect, a latex composition for dip molding includes a carboxylic acid-modified nitrile-based copolymer latex and a cholate-based emulsifier, wherein the cholate-based emulsifier is included in an amount of 0.02 to 3 parts by weight with respect to a solid content of 100 parts by weight of the carboxylic acid-modified nitrile-based copolymer latex.

In another general aspect, a method of preparing a latex composition for dip molding includes a step S10 of preparing a carboxylic acid-modified nitrile-based copolymer latex, and a step S20 of mixing the prepared carboxylic acid-modified nitrile-based copolymer latex and a cholate-based emulsifier with each other, wherein in the step S20, the cholate-based emulsifier is mixed in an amount of 0.02 to 3 parts by weight with respect to a solid content of 100 parts by weight of the carboxylic acid-modified nitrile-based copolymer latex.

In still another general aspect, a molded article includes a layer derived from the latex composition for dip molding.

Advantageous Effects

In the latex composition for dip molding according to the present invention, the cholate-based emulsifier having both a hydrophilic group and a solid steroid ring skeleton is used, such that the dispersibility of the latex particles is improved and the stability of the latex is improved. Accordingly, the syneresis time is increased, and in a case where a dip-molded article such as a glove is produced using the latex composition for dip molding, the workability and tensile strength are excellent, and the modulus is reduced, such that the wearability is improved.

BEST MODE

The terms and words used in the description and claims of the present invention are not to be construed as general or dictionary meanings but are to be construed as meanings and concepts meeting the technical ideas of the present invention based on a principle that the inventors can appropriately define the concepts of terms in order to describe their own inventions in the best mode.

Hereinafter, the present invention will be described in more detail in order to assist in the understanding of the present invention.

The term "monomer-derived repeating unit" in the present invention may refer to a component or structure derived from a monomer or a material itself, and as a specific example, may refer to a repeating unit formed in a polymer by an added monomer participating in a polymerization reaction during polymerization of the polymer.

The term "latex" in the present invention may refer to that a polymer or a copolymer polymerized by polymerization is present in a form dispersed in water. As a specific example, the term "latex" may refer to that fine particles of a rubber-like polymer or fine particles of a rubber-like copolymer polymerized by emulsion polymerization are present in a colloidal state in which the fine particles are dispersed in water.

The term "layer derived" in the present invention may refer to a layer formed from a polymer or a copolymer. As a specific example, the term "layer derived" may refer to a layer formed from a polymer or a copolymer by attaching, fixing, and/or polymerizing the polymer or the copolymer on a dip molding mold when producing a dip-molded article.

The term "cross-linking part derived from a cross-linking agent" in the present invention may refer to a component or structure derived from a compound or a material itself, and may refer to a "cross-linking part" for cross-linking in a polymer or between polymers, the polymer being formed by an action and reaction of a cross-linking agent composition.

The term "alkyl" in the present invention may refer to a monovalent linear or branched saturated hydrocarbon of a carbon atom, such as methyl, ethyl, propyl, 2-propyl, n-butyl, iso-butyl, tert-butyl, pentyl, hexyl, or dodecyl, and may refer to not only unsubstituted alkyl but also alkyl substituted by a substituent.

The term "cycloalkyl" in the present invention may refer to that in which at least one hydrogen atom of the alkyl group defined as described above is substituted with a saturated or unsaturated non-aromatic monovalent monocyclic, bicyclic, or tricyclic hydrocarbon of a cyclic hydrocarbon, such as cyclopropyl, cyclobutyl, cyclopentyl, cyclopentenyl, cyclohexyl, cyclohexenyl, cycloheptyl, cyclooctyl, decahydronaphthalenyl, adamantanyl, or norbornyl (that is, bicyclo[2,2,1]hept-5-enyl), and may refer to not only unsubstituted cycloalkyl but also cycloalkyl substituted by a substituent.

The term "aryl" in the present invention may refer to that in which at least one hydrogen atom of the alkyl group defined as described above is substituted with an aryl group, such as phenyl, naphthalenyl, or fluorenyl, and may refer to not only unsubstituted aryl but also aryl substituted by a substituent.

The term "(meth)acrylate" in the present invention may refer to both "acrylate" and "methacrylate".

A latex composition for dip molding according to the present invention may include a carboxylic acid-modified nitrile-based copolymer latex and a cholate-based emulsifier.

According to an exemplary embodiment of the present invention, a carboxylic acid-modified nitrile-based copolymer included in the carboxylic acid-modified nitrile-based copolymer latex may include a conjugated diene-based monomer-derived repeating unit, an ethylenically unsaturated nitrile-based monomer-derived repeating unit, and an ethylenically unsaturated acid monomer-derived repeating unit.

According to an exemplary embodiment of the present invention, a conjugated diene-based monomer constituting the conjugated diene-based monomer-derived repeating unit may be one or more selected from the group consisting of 1,3-butadiene, 2,3-dimethyl-1,3-butadiene, 2-ethyl-1,3-butadiene, 1,3-pentadiene, and isoprene. As a specific example, the conjugated diene-based monomer may be 1,3-butadiene or isoprene, and as a more specific example, the conjugated diene-based monomer may be 1,3-butadiene.

A content of the conjugated diene-based monomer-derived repeating unit may be 40 wt % to 89 wt %, 45 wt % to 80 wt %, or 50 wt % to 78 wt %, with respect to a total content of the carboxylic acid-modified nitrile-based copolymer. Within these ranges, a dip-molded article molded from the latex composition for dip molding including the carboxylic acid-modified nitrile-based copolymer is flexible and has not only excellent texture and wearability but also excellent oil resistance and tensile strength.

In addition, according to an exemplary embodiment of the present invention, an ethylenically unsaturated nitrile-based monomer constituting the ethylenically unsaturated nitrile-based monomer-derived repeating unit may be one or more selected from the group consisting of acrylonitrile, methacrylonitrile, fumaronitrile, α-chloronitrile, and α-cyanoethylacrylonitrile. As a specific example, the ethylenically unsaturated nitrile-based monomer may be acrylonitrile or methacrylonitrile, and as a more specific example, the ethylenically unsaturated nitrile-based monomer may be acrylonitrile.

A content of the ethylenically unsaturated nitrile-based monomer-derived repeating unit may be 10 wt % to 50 wt %, 15 wt % to 45 wt %, or 20 wt % to 40 wt %, with respect to the total content of the carboxylic acid-modified nitrile-based copolymer. Within these ranges, a dip-molded article molded from the latex composition for dip molding including the carboxylic acid-modified nitrile-based copolymer is flexible and has not only excellent texture and wearability but also excellent oil resistance and tensile strength.

In addition, according to an exemplary embodiment of the present invention, an ethylenically unsaturated acid monomer constituting the ethylenically unsaturated acid monomer-derived repeating unit may be an ethylenically unsaturated monomer having an acid group such as a carboxyl group, a sulfonic acid group, or an acid anhydride group. As a specific example, the ethylenically unsaturated acid monomer may be one or more selected from the group consisting of an ethylenically unsaturated acid monomer such as acrylic acid, methacrylic acid, itaconic acid, maleic acid, or fumaric acid; a polycarboxylic acid anhydride such as maleic acid anhydride or citraconic acid anhydride; an ethylenically unsaturated sulfonic acid monomer such as styrenesulfonic acid; and an ethylenically unsaturated polycarboxylic acid partial ester monomer such as monobutyl fumarate, monobutyl maleate, or mono-2-hydroxypropyl maleate. As a more specific example, the ethylenically unsaturated acid monomer may be one or more selected from the group consisting of acrylic acid, methacrylic acid, itaconic acid, maleic acid, and fumaric acid, and as a still more specific example, the ethylenically unsaturated acid monomer may be methacrylic acid. The ethylenically unsaturated acid monomer may be used in a form of a salt such as an alkali metal salt or an ammonium salt during polymerization.

A content of the ethylenically unsaturated acid monomer-derived repeating unit may be 0.1 wt % to 15 wt %, 0.5 wt % to 9 wt %, or 1 wt % to 8 wt %, with respect to the total content of the carboxylic acid-modified nitrile-based copolymer. Within these ranges, a dip-molded article molded from the latex composition for dip molding including the carboxylic acid-modified nitrile-based copolymer is flexible and has not only excellent wearability but also excellent oil resistance and tensile strength.

According to an exemplary embodiment of the present invention, the carboxylic acid-modified nitrile-based copolymer latex may further selectively include an ethylenically unsaturated monomer-derived repeating unit, in addition to the conjugated diene-based monomer-derived repeating unit, the ethylenically unsaturated nitrile-based monomer-derived repeating unit, and the ethylenically unsaturated acid monomer-derived repeating unit.

The ethylenically unsaturated monomer constituting the ethylenically unsaturated monomer-derived repeating unit may be one or more selected from the group consisting of a vinyl aromatic monomer selected from the group consisting of styrene, arylstyrene, and vinyl naphthalene; fluoroalkyl vinyl ether such as fluoro ethyl vinyl ether; an ethylenically unsaturated amide monomer selected from the group consisting of (meth)acrylamide, N-methylol (meth)acrylamide, N,N-dimethylol (meth)acrylamide, N-methoxymethyl (meth)acrylamide, and N-propoxymethyl (meth)acrylamide; a non-conjugated diene monomer such as vinyl pyridine, vinyl norbornene, dicyclopentadiene, or 1,4-hexadiene; and an ethylenically unsaturated carboxylic acid ester monomer selected from the group consisting of methyl (meth)acrylate, ethyl (meth)acrylate, butyl (meth)acrylate, 2-ethylhexyl (meth)acrylate, trifluoroethyl (meth)acrylate, tetrafluoropropyl (meth)acrylate, dibutyl maleate, dibutyl fumarate, diethyl maleate, methoxymethyl (meth)acrylate, ethoxyethyl (meth)acrylate, methoxyethoxyethyl (meth)acrylate, cyanomethyl (meth)acrylate, 2-cyanoethyl (meth)acrylate, 1-cyanopropyl (meth)acrylate, 2-ethyl-6-cyanohexyl (meth)acrylate, 3-cyanopropyl (meth)acrylate, hydroxyethyl (meth)acrylate, hydroxypropyl (meth)acrylate, glycidyl (meth)acrylate, and dimethylamino ethyl (meth)acrylate.

A content of the ethylenically unsaturated monomer-derived repeating unit may be within 20 wt %, 0.01 to 20 wt %, or 0.01 to 15 wt %, with respect to the total content of the carboxylic acid-modified nitrile-based copolymer. Within these ranges, a dip-molded article molded from the latex composition for dip molding including the carboxylic acid-modified nitrile-based copolymer has not only excellent texture and wearability but also excellent tensile strength.

According to an exemplary embodiment of the present invention, a glass transition temperature of the carboxylic acid-modified nitrile-based copolymer latex may be −50° C. to −15° C., −47° C. to −15° C., or −45° C. to −20° C. Within these ranges, a molded article dip-molded from the latex composition for dip molding including the carboxylic acid-modified nitrile-based copolymer latex has excellent wearability due to its low stickiness while preventing degradation in tensile properties such as tensile strength, and cracks. The glass transition temperature may be measured using differential scanning calorimetry.

In addition, according to an exemplary embodiment of the present invention, an average particle size of particles of the carboxylic acid-modified nitrile-based copolymer in the carboxylic acid-modified nitrile-based copolymer latex may be 50 nm to 500 nm, 80 nm to 300 nm, or 100 nm to 150 nm. Within these ranges, a viscosity of the carboxylic acid-modified nitrile-based copolymer latex is not increased, such that a carboxylic acid-modified nitrile-based copolymer latex may be prepared at a high concentration, and a molded article dip-molded from the latex composition for dip molding including the carboxylic acid-modified nitrile-based copolymer latex has excellent tensile properties such as tensile strength. In addition, within the above ranges, a film forming rate is excellent, and a syneresis property is thus excellent. The average particle size may be measured using a laser scattering analyzer (Nicomp).

Meanwhile, according to an exemplary embodiment of the present invention, the cholate-based emulsifier may be one or more selected from the group consisting of cholic acid, glycocholic acid, taurocholic acid, deoxycholic acid, chenodeoxycholic acid, glycochenodeoxycholic acid, taurochenodeoxycholic acid, and lithocholic acid, or one or more selected from the group consisting of cholate, glycocholate, taurocholate, deoxycholate, chenodeoxycholate, glycochenodeoxycholate, taurochenodeoxycholate, and lithocholate which are salt forms thereof. Meanwhile, here, the salt may be a monovalent salt of sodium or potassium.

Since the cholate-based emulsifier has a hydroxyl group and a carboxylate group which are hydrophilic groups, the cholate-based emulsifier has excellent mixability and dispersibility in water. In addition, the cholate-based emulsifier has a solid steroid ring skeleton having hydrophobicity, and such a hydrophobic structure allows the cholate-based emulsifier to be attached well to a particle surface of the carboxylic acid-modified nitrile-based copolymer. As a result, in the carboxylic acid-modified nitrile-based copolymer, ionic repulsion between the particles is increased, and an aggregation of the particles is thus reduced, such that the dispersibility of the particles is improved, and furthermore, the stability of the latex is improved. In addition, the cholate-based emulsifier has a bulky steroid ring structure, such that a latex film formation time is delayed when producing a molded article. Thus, a coagulant and water are contained for a longer time, which is effective in increasing the syneresis time.

A content of the cholate-based emulsifier may be 0.02 to 3 parts by weight, specifically, 0.1 parts by weight to 2.2 parts by weight, and more specifically, 0.1 parts by weight to 1.5 parts by weight, with respect to a solid content of 100 parts by weight of the carboxylic acid-modified nitrile-based copolymer latex. Within these ranges, the syneresis time of the latex composition for dip molding is increased and the stability is thus improved, and tensile strength of a glove which is a dip-molded article produced using the latex composition for dip molding is increased. Specifically, by using the cholate-based emulsifier, precipitation and generation of the coagulation in the latex are suppressed, such that a defect which may occur due to adsorption of the coagulation or the like to the molded article may be suppressed. As a result, the physical properties of the molded article are generally improved.

In addition, according to an exemplary embodiment of the present invention, the cholate-based emulsifier included in the latex composition for dip molding may be an emulsifier derived from additional addition and mixing with the carboxylic acid-modified nitrile-based copolymer when preparing the latex composition for dip molding, rather than a component derived when preparing the carboxylic acid-modified nitrile-based copolymer. The cholate-based emulsifier may be different from an emulsifier to be added when preparing the carboxylic acid-modified nitrile-based copolymer.

In addition, according to an exemplary embodiment of the present invention, the latex composition for dip molding may further include an additive such as a vulcanizing agent, an ionic cross-linking agent, a pigment, a vulcanization catalyst, a filler, or a pH adjuster, if necessary.

In addition, according to an exemplary embodiment of the present invention, a solid content (concentration) of the latex composition for dip molding may be, for example, 5 wt % to 40 wt %, 8 wt % to 35 wt %, or 10 wt % to 33 wt %. Within these ranges, latex transport efficiency is excellent, and an increase in viscosity of the latex is prevented, such that storage stability is excellent.

As another example, a pH of the latex composition for dip molding may be 8 to 12, 9 to 11, or 9.3 to 11. Within these ranges, workability and productivity when producing a dip-molded article are excellent. The pH of the latex composition for dip molding may be adjusted by addition of the pH adjuster described above. Examples of the pH adjuster may include an aqueous potassium hydroxide solution having a concentration of 1 wt % to 5 wt %, and ammonia water having a concentration of 1 wt % to 5 wt %.

Meanwhile, a method of preparing the latex composition for dip molding according to the present invention may include: a step S10 of preparing a carboxylic acid-modified nitrile-based copolymer latex; and a step S20 of mixing the prepared carboxylic acid-modified nitrile-based copolymer latex and a cholate-based emulsifier with each other.

That is, the method of preparing the latex composition for dip molding according to the present invention may include: a step of polymerizing a monomer mixture including a conjugated diene-based monomer, an ethylenically unsaturated nitrile-based monomer, and an ethylenically unsaturated acid monomer to prepare a carboxylic acid-modified nitrile-based copolymer latex including a carboxylic acid-modified nitrile-based copolymer; and a step of adding a cholate-based emulsifier to the carboxylic acid-modified nitrile-based copolymer latex and mixing them.

According to an exemplary embodiment of the present invention, the polymerization of the carboxylic acid-modified nitrile-based copolymer may be performed through emulsion polymerization. The polymerization may be performed through polymerization of the monomer mixture, and the respective monomers included in the monomer mixture may be added in the same type and content of the monomer as those described above, may be added at the same time, or may be continuously added.

Meanwhile, in the polymerization, the entire monomer mixture may be added to a polymerization reactor prior to the polymerization, or a part of the monomer mixture may be primarily added to the polymerization reactor and a residual monomer mixture may be added after polymerization is initiated. In a case where the monomer mixture is separately added as described above, a distribution of the monomers may be uniform due to a reaction speed difference between the monomers when a monomer-derived repeating unit is formed from each monomer in the carboxylic acid-modified nitrile-based copolymer. Therefore, a balance between physical properties of a dip-molded article produced by using the carboxylic acid-modified nitrile-based copolymer may be improved.

In addition, according to an exemplary embodiment of the present invention, the polymerization of the carboxylic acid-modified nitrile-based copolymer may be performed in the presence of an emulsifier, a polymerization initiator, an activator, a chain transfer agent, or the like.

In a case where the polymerization of the carboxylic acid-modified nitrile-based copolymer is performed by including an emulsifier, the emulsifier may be, for example, one or more selected from the group consisting of an anionic surfactant, a non-ionic surfactant, a cationic surfactant, and an amphoteric surfactant. As a specific example, the emulsifier may be one or more anionic surfactants selected from the group consisting of alkyl benzene sulfonate, aliphatic sulfonate, higher alcohol sulfate ester, α-olefin sulfonate, and alkyl ether sulfate. In addition, the emulsifier may be added in an amount of 0.3 parts by weight to 10 parts by weight, 0.8 parts by weight to 8 parts by weight, or 1.5 parts by weight to 8 parts by weight, with respect to a total content of 100 parts by weight of the monomer mixture. Within these ranges, the polymerization stability is excellent, and a molded article is easily produced due to a small amount of foam.

In addition, in a case where the polymerization of the carboxylic acid-modified nitrile-based copolymer is performed by including a polymerization initiator, the polymerization initiator may be, for example, an oxidation-reduction initiator or a thermal initiator. The oxidation-reduction initiator may include one or two or more selected from the group consisting of sulfur dioxide, sodium sulfite, isoascorbic acid, and sodium formaldehyde sulfoxylate. As a specific example, ascorbic acid may be used. A content of the oxidation-reduction initiator may be 0.001 parts by weight to 5.0 parts by weight, 0.01 parts by weight to 4.0 parts by weight, or 0.05 to 3.0 parts by weight, with respect to the total content of 100 parts by weight of the monomer mixture. Within these ranges, a polymerization speed is maintained at an appropriate level.

The thermal initiator may include one or two or more selected from the group consisting of inorganic peroxide such as sodium persulfate, potassium persulfate, ammonium persulfate, potassium perphosphate, or hydrogen peroxide; organic peroxide such as t-butyl peroxide, cumene hydroperoxide, p-menthane hydroperoxide, di-t-butyl peroxide, t-butylcumyl peroxide, acetyl peroxide, isobutyl peroxide, octanoyl peroxide, dibenzoyl peroxide, 3,5,5-trimethylhexanol peroxide, or t-butyl peroxy isobutylate; azobisisobutyronitrile, azobis-2,4-dimethylvaleronitrile, azobiscyclohexanecarbonitrile, and methyl azobisisobutyrate. As a specific example, the thermal initiator may be inorganic peroxide, and as a more specific example, the thermal initiator may be potassium persulfate. A content of the thermal initiator may be 0.01 parts by weight to 2.0 parts by weight, 0.02 parts by weight to 1.5 parts by weight, or 0.05 to 1.0 part by weight, with respect to the total content of 100 parts by weight of the monomer mixture. Within these ranges, in a case where the thermal initiator is used together with the oxidation-reduction initiator, the polymerization speed may be maintained at an appropriate level.

In addition, in a case where the polymerization of the carboxylic acid-modified nitrile-based copolymer is performed by including an activator, the activator may be one or more selected from the group consisting of sodium formaldehyde, sulfoxylate, sodium ethylenediaminetetraacetate, ferrous sulfate, dextrose, sodium pyrophosphate, and sodium sulfite. In addition, the activator may be added in an amount of 0.01 parts by weight to 2.0 parts by weight, 0.02 parts by weight to 1.5 parts by weight, or 0.05 parts by weight to 1.0 part by weight, with respect to the total content of 100 parts by weight of the monomer mixture. Within these ranges, the polymerization speed may be maintained at an appropriate level.

In addition, in a case where the polymerization of the carboxylic acid-modified nitrile-based copolymer is performed by including a chain transfer agent, the chain transfer agent may be, for example, one or two or more selected from the group consisting of mercaptans such as α-methylstyrenedimer, t-dodecyl mercaptan, n-dodecyl mercaptan, and octyl mercaptan; halogenated hydrocarbons such as carbon tetrachloride, methylene chloride, and methylene bromide; and sulfur-containing compounds such as tetraethylthiuram disulfide, dipentamethylenethiuram disulfide, and diisopropylxanthogen disulfide. As a specific example, the chain transfer agent may be mercaptans, and as a more specific example, the chain transfer agent may be t-dodecyl mercaptan. In addition, the chain transfer agent may be added in an amount of 0.1 parts by weight to 2 parts by weight, 0.2 parts by weight to 1.5 parts by weight, or 0.3 parts by weight to 1.0 part by weight, with respect to the total content of 100 parts by weight of the monomer mixture. Within these ranges, the polymerization stability is excellent, and physical properties of a molded article when producing the molded article after the polymerization are excellent.

In addition, according to an exemplary embodiment of the present invention, the polymerization of the carboxylic acid-modified nitrile-based copolymer may be performed in a medium such as water, as a specific example, deionized water. The polymerization may be performed by further including an additive such as a chelating agent, a dispersant, a pH adjuster, a deoxidizer, a particle size adjuster, an antioxidant, or an oxygen scavenger, if necessary, to ensure ease of polymerization.

According to an exemplary embodiment of the present invention, the emulsifier, the polymerization initiator, the chain transfer agent, the additive, and the like may be added at the same time, or separately added to a polymerization reactor, together with the monomer mixture, and each addition may be continuously performed.

In addition, according to an exemplary embodiment of the present invention, the polymerization of the carboxylic acid-modified nitrile-based copolymer may be performed at a polymerization temperature of 10° C. to 90° C., 20° C. to 80° C., or 25° C. to 75° C. Within these ranges, latex stability is excellent.

Meanwhile, according to an exemplary embodiment of the present invention, a method of preparing the carboxylic acid-modified nitrile-based copolymer latex may include a step of terminating a polymerization reaction to obtain a carboxylic acid-modified nitrile-based copolymer latex. The termination of the polymerization reaction of the carboxylic acid-modified nitrile-based copolymer may be performed at the point where a polymerization conversion rate is 90% or more, 91% or more, or 92% to 99.9%. The termination of the polymerization reaction may be performed by addition of a polymerization terminating agent, a pH adjuster, or an antioxidant. In addition, the method of preparing the carboxylic acid-modified nitrile-based copolymer latex may further include a step of removing unreacted monomers through a deodorization and concentration process, after the reaction termination.

In addition, according to an exemplary embodiment of the present invention, the step of adding the cholate-based emulsifier to the carboxylic acid-modified nitrile-based copolymer latex and mixing them may be a step for preparing a latex composition for dip molding using the carboxylic acid-modified nitrile-based copolymer latex for dip molding. In this case, a type and content of the cholate-based emulsifier may be the same as those as described above. In addition, the cholate-based emulsifier may be different from the emulsifier to be added in the polymerization described above.

According to an exemplary embodiment of the present invention, the cholate-based emulsifier is mixed with the prepared carboxylic acid-modified nitrile-based copolymer latex, such that the syneresis time is increased, and the tensile strength and stress (modulus) are improved. Meanwhile, in a case where the cholate-based emulsifier is added when preparing (polymerizing) the carboxylic acid-modified nitrile-based copolymer latex rather than being mixed with the prepared carboxylic acid-modified nitrile-based copolymer latex, the number of particles in the carboxylic acid-modified nitrile-based copolymer latex is reduced, which may cause a decrease in syneresis time.

According to the present invention, a molded article including a layer derived from the latex composition for dip molding is provided. The molded article may be a dip-molded article produced by dip molding the latex composition for dip molding, and may be a molded article including a layer derived from the latex composition for dip molding formed from the latex composition for dip molding by dip molding. A method of producing the molded article may include a step of dipping the latex composition for dip molding by a direct dipping method, an anode coagulation dipping method, a Teague's coagulation method, or the like. As a specific example, the molded article may be produced by an anode coagulation dipping method, and in this case, a dip-molded article having a uniform thickness may be obtained.

As a specific example, the method of producing the molded article may include: a step S100 of attaching a coagulant to a dip molding mold; a step S200 of dipping the dip molding mold to which the coagulant is attached into a latex composition for dip molding to form a layer derived from the latex composition for dip molding, that is, a dip-molded layer; and a step S300 of heating the dip-molded layer to cross-link the latex composition for dip molding.

The step S100 is a step of dipping a dip molding mold into a coagulant solution to attach a coagulant to the dip molding mold so as to attach the coagulant to a surface of the dip molding mold. The coagulant solution is a solution obtained by dissolving a coagulant in water, alcohol, or a mixture thereof. A content of the coagulant in the coagulant solution may be 5 wt % to 50 wt %, 7 wt % to 45 wt %, or 10 wt % to 40 wt %, with respect to a total content of the coagulant solution. The coagulant may be, for example, one or more selected from the group consisting of metal halide such as barium chloride, calcium chloride, magnesium chloride, zinc chloride, or aluminum chloride; nitrate such as barium nitrate, calcium nitrate, or zinc nitrate; acetate such as barium acetate, calcium acetate, or zinc acetate; and sulfate such as calcium sulfate, magnesium sulfate, or aluminum sulfate. As a specific example, the coagulant may be calcium chloride or calcium nitrate.

In addition, the step S200 may be a step of dipping the dip molding mold to which the coagulant is attached into the latex composition for dip molding according to the present invention and taking out the dip molding mold to form a dip-molded layer on the dip molding mold.

In addition, the step S300 may be a step of heating the dip-molded layer formed on the dip molding mold and cross-linking and curing the latex composition for dip molding to obtain a dip-molded article.

Thereafter, the dip-molded layer cross-linked by the heating treatment may be removed from the dip molding mold to obtain a dip-molded article.

According to an exemplary embodiment of the present invention, the molded article may be a glove such as a surgical glove, an examination glove, an industrial glove, or a household glove, a condom, a catheter, or a health care product.

Hereinafter, the present invention will be described in more detail by examples. However, the following examples are provided for illustrating the present invention. It is apparent to a person skilled in the art that various modifications and alterations may be made without departing from the scope and spirit of the present invention, and the scope of the present invention is not limited thereto.

EXAMPLES

Example 1

<Preparation of Carboxylic Acid-Modified Nitrile-Based Copolymer Latex>

After a 10 L high-pressure reactor being equipped with a thermometer, a cooler, and an inlet port of nitrogen gas, and allowing for continuous addition of monomers, an emulsifier, and a polymerization initiator was purged with nitrogen, 100 parts by weight of a monomer mixture composed of 30 wt % of acrylonitrile, 65 wt % of 1,3-butadiene, and 5 wt % of methacrylic acid, 2.5 parts by weight of alkyl benzene sulfonate, 0.5 parts by weight of t-dodecyl mercaptan, and 140 parts by weight of ion exchange water were added to the reactor, and a temperature was raised to 38° C. After the temperature was raised, 0.3 parts by weight of potassium persulfate which was a polymerization initiator was added, and the polymerization was terminated by adding 0.1 parts by weight of sodium dimethyldithiocarbamate at the point where a polymerization conversion rate was 95%. Subsequently, a certain amount of unreacted monomers was removed through a deodorization process, and 0.5 parts by weight of ammonia water, 0.5 parts by weight of an antioxidant, and 0.1 parts by weight of a defoaming agent were added to obtain a carboxylic acid-modified nitrile-based copolymer latex having a solid content concentration of 45 wt % and a pH of 8.5.

<Preparation of Latex Composition for Dip Molding>

To 100 parts by weight (based on a solid content) of the obtained carboxylic acid-modified nitrile-based copolymer latex, 0.1 parts by weight of sodium cholate (sodium cholate hydrate, produced by Sigma-Aldrich) diluted in distilled water at 3 wt %, 2.0 parts by weight of a potassium hydroxide solution diluted in distilled water at 3 wt %, and secondary distilled water were added to obtain a latex composition for dip molding having a solid content concentration of 20 wt % and a pH of 10.

<Production of Dip-Molded Article>

15 parts by weight of calcium nitrate, 84.5 parts by weight of distilled water, and 0.5 parts by weight of a wetting agent (Teric 320, produced by Huntsman Corporation, Australia) were mixed with each other to prepare a coagulant solution. A hand-shaped ceramic mold was dipped into the prepared coagulant solution for 1 minute and taken out from the coagulant solution, and the hand-shaped mold was dried at 80° C. for 4 minutes, thereby applying a coagulant to the hand-shaped mold.

Thereafter, the mold to which the coagulant was applied was dipped into the obtained latex composition for dip molding for 1 minute and taken out from the latex composition, and the mold was dried at 80° C. for 3 minutes. Subsequently, the mold was dipped into water for 3 minutes to carry out leaching, the mold was dried again at 80° C. for 3 minutes, and the dried mold was subjected to cross-linking at 130° C. for 20 minutes. The cross-linked dip-molded layer was removed from the hand-shaped mold, thereby obtaining a dip-molded article having a glove shape.

Example 2

Example 2 was performed in the same manner as that of Example 1, except that the sodium cholate was added in an amount of 0.5 parts by weight instead of 0.1 parts by weight when preparing the latex composition for dip molding in Example 1.

Example 3

Example 3 was performed in the same manner as that of Example 1, except that the sodium cholate was added in an amount of 1.0 part by weight instead of 0.1 parts by weight when preparing the latex composition for dip molding in Example 1.

Example 4

Example 4 was performed in the same manner as that of Example 1, except that the sodium cholate was added in an amount of 3.0 parts by weight instead of 0.1 parts by weight when preparing the latex composition for dip molding in Example 1.

Example 5

Example 5 was performed in the same manner as that of Example 3, except that 1.0 part by weight of sodium chenodeoxycholate (produced by Sigma-Aldrich) was added as a cholate-based emulsifier instead of 1.0 part by weight of the sodium cholate when preparing the latex composition for dip molding in Example 3.

Comparative Example 1

Comparative Example 1 was performed in the same manner as that of Example 1, except that the sodium cholate was not used when preparing the latex composition for dip molding in Example 1.

Comparative Example 2

Comparative Example 2 was performed in the same manner as that of Example 1, except that the sodium cholate was added in an amount of 0.01 parts by weight instead of 0.1 parts by weight when preparing the latex composition for dip molding in Example 1.

Comparative Example 3

Comparative Example 3 was performed in the same manner as that of Example 1, except that the sodium cholate was added in an amount of 0.05 parts by weight instead of 0.1 parts by weight when preparing the latex composition for dip molding in Example 1.

Comparative Example 4

Comparative Example 4 was performed in the same manner as that of Example 1, except that the sodium cholate was added in an amount of 5 parts by weight instead of 0.1 parts by weight when preparing the latex composition for dip molding in Example 1.

Comparative Example 5

Comparative Example 5 was performed in the same manner as that of Example 3, except that 1.0 part by weight of sodium dodecylsulfate (produced by Sigma-Aldrich) was added instead of 1.0 part by weight of the sodium cholate when preparing the latex composition for dip molding in Example 3.

Comparative Example 6

Comparative Example 6 was performed in the same manner as that of Example 3, except that 1.0 part by weight of sodium dodecylbenzene sulfonate (produced by Sigma-Aldrich) was added instead of 1.0 part by weight of the sodium cholate when preparing the latex composition for dip molding in Example 3.

EXPERIMENTAL EXAMPLE

Tensile strength, stress at each of 300% and 500%, and syneresis of each of the dip-molded articles produced in Examples 1 to 5 and Comparative Examples 1 to 6 were measured to compare physical properties of the dip-molded articles with each other. The results are shown in Tables 1 and 2.

Tensile strength (MPa), modulus (MPa) at elongation of 300%, and modulus (MPa) at elongation of 500%: A dumbbell-shaped specimen was prepared according to EN 455-2. Subsequently, the specimen was pulled at a stretching speed of 500 mm/min, and stress at an elongation of each of 300% and 500% and tensile strength at break were measured.

Syneresis (sec): In order to confirm a syneresis time, the mold to which the coagulant was applied was dipped into each of the latex composition for dip molding of the examples and the comparative examples for 1 minute and pulled up, the mold was dried at a temperature of 120° C. for 4 minutes, and the dried mold was dipped into water again for 3 minutes. Thereafter, a time at which water drops were dropped during drying at the temperature of 120° C. for 4 minutes was confirmed. As the syneresis time increases, the syneresis property is excellent.

TABLE 1

| Classification | Example | | | | |
|---|---|---|---|---|---|
| | 1 | 2 | 3 | 4 | 5 |
| Tensile strength (MPa) | 37.8 | 38.7 | 38.9 | 37.5 | 37.9 |
| Modulus (MPa) of 300% | 6.11 | 5.87 | 5.60 | 4.98 | 5.11 |
| Modulus (MPa) of 500% | 12.29 | 11.91 | 11.22 | 10.31 | 10.87 |
| Syneresis (sec) | 131 | 237 | 360 or longer | 360 or longer | 247 |

TABLE 2

| Classification | Comparative Example | | | | | |
|---|---|---|---|---|---|---|
| | 1 | 2 | 3 | 4 | 5 | 6 |
| Tensile strength (MPa) | 36.9 | 37.2 | 37.1 | 29.8 | 33.5 | 36.4 |
| Modulus (MPa) of 300% | 5.20 | 5.25 | 5.18 | 5.15 | 5.43 | 5.23 |
| Modulus (MPa) of 500% | 11.68 | 11.55 | 11.49 | 11.20 | 10.85 | 10.98 |
| Syneresis (sec) | 63 | 59 | 67 | 360 or longer | 98 | 119 |

Referring to Tables 1 and 2, it could be confirmed that in a case where sodium cholate or sodium chenodeoxycholate was included in the latex composition for dip molding as a cholate-based emulsifier in Examples 1 to 5 according to the present invention, the tensile strength was improved and the syneresis was significantly increased without deterioration of the modulus property.

On the contrary, it could be confirmed that in a case where the cholate-based emulsifier was not used (Comparative Example 1) or was added at an appropriate level or less (Comparative Examples 2 and 3), the syneresis time was short. Furthermore, it could be appreciated that in a case where the cholate-based emulsifier was excessively added (Comparative Example 4), the syneresis was increased, but mechanical properties of the molded article, such as the tensile strength, were significantly deteriorated.

Meanwhile, in a case where the same amount of another emulsifier was added instead of the cholate-based emulsifier of the present invention, it was difficult to expect simultaneous improvement of the desired levels of tensile strength and syneresis.

The invention claimed is:

1. A latex composition for dip molding, comprising:
a carboxylic acid-modified nitrile-based copolymer latex; and
a cholate-based emulsifier,
wherein the cholate-based emulsifier is included in an amount of 0.5 to 3 parts by weight with respect to a solid content of 100 parts by weight of the carboxylic acid-modified nitrile-based copolymer latex.

2. The latex composition for dip molding of claim 1, wherein the cholate-based emulsifier is one or more selected from the group consisting of cholic acid, glycocholic acid, taurocholic acid, deoxycholic acid, chenodeoxycholic acid, glycochenodeoxycholic acid, taurochenodeoxycholic acid, and lithocholic acid.

3. The latex composition for dip molding of claim 1, wherein the cholate-based emulsifier is one or more salts selected from the group consisting of cholate, glycocholate, taurocholate, deoxycholate, chenodeoxycholate, glycochenodeoxycholate, taurochenodeoxycholate, and lithocholate.

4. The latex composition for dip molding of claim 1, wherein the cholate-based emulsifier is sodium cholate.

5. The latex composition for dip molding of claim 1, wherein the cholate-based emulsifier is included in an amount of 0.5 to 1.5 parts by weight with respect to the solid content of 100 parts by weight of the carboxylic acid-modified nitrile-based copolymer latex.

6. A method of preparing the latex composition for dip molding of claim 1, the method comprising:
preparing a carboxylic acid-modified nitrile-based copolymer latex; and
mixing the prepared carboxylic acid-modified nitrile-based copolymer latex and a cholate-based emulsifier with each other,
wherein in the mixing, the cholate-based emulsifier is mixed in an amount of 0.5 to 3 parts by weight with respect to a solid content of 100 parts by weight of the carboxylic acid-modified nitrile-based copolymer latex.

7. The method of claim 6, wherein the cholate-based emulsifier is one or more selected from the group consisting of cholic acid, glycocholic acid, taurocholic acid, deoxycholic acid, chenodeoxycholic acid, glycochenodeoxycholic acid, taurochenodeoxycholic acid, lithocholic acid, and salts thereof.

8. A molded article comprising a layer derived from the latex composition for dip molding of claim 1.

9. The latex composition of claim 1, wherein the cholate-based emulsifier suppresses coagulation in the latex composition.

\* \* \* \* \*